United States Patent [19]

Schneider

[11] Patent Number: 4,461,324

[45] Date of Patent: Jul. 24, 1984

[54] RUBBER HOSE

[75] Inventor: Kurt Schneider, Hamburg, Fed. Rep. of Germany

[73] Assignee: Eddelbüttel & Schneider, Hamburg, Fed. Rep. of Germany

[21] Appl. No.: 358,691

[22] Filed: Mar. 16, 1982

Related U.S. Application Data

[63] Continuation of Ser. No. 18,670, Mar. 8, 1979, abandoned, which is a continuation of Ser. No. 840,222, Oct. 7, 1977, abandoned.

[30] Foreign Application Priority Data

Oct. 8, 1976 [DE] Fed. Rep. of Germany ... 7631503[U]

[51] Int. Cl.$^3$ .............................................. F16L 9/00
[52] U.S. Cl. .................................... 138/174; 138/138
[58] Field of Search ............... 138/133, 138, 144, 172, 138/174

[56] References Cited

U.S. PATENT DOCUMENTS

| 132,006 | 10/1872 | Harris | 138/138 X |
| 1,205,984 | 11/1916 | Forsyth | 138/133 |
| 2,741,267 | 4/1956 | McKinley | 138/133 |
| 3,169,552 | 2/1965 | Fawick | 138/133 |
| 3,548,884 | 12/1970 | Ambrose | 138/144 |

FOREIGN PATENT DOCUMENTS

| 792388 | 12/1935 | France | 138/138 |
| 1499956 | 11/1967 | France | 138/133 |
| 869238 | 5/1961 | United Kingdom | 138/133 |

Primary Examiner—Charles E. Phillips
Attorney, Agent, or Firm—Becker & Becker, Inc.

[57] ABSTRACT

A hose of rubber material with a reinforced hose wall for conveying in wet condition large volume sharp-edged solid materials while the inner wall of the hose utilizes a rubber layer as protection against wear. Metallic bodies are embedded in and adhering to the rubber layer and have substantially the same thickness as the rubber layer.

1 Claim, 2 Drawing Figures

RUBBER HOSE

This is a continuation of co-pending application Ser. No. 018,670-Schneider filed Mar. 8, 1979, now abandoned, which last-mentioned application was a continuation of parent application Ser. No. 840,222-Schneider filed Oct. 7, 1977, now abandoned.

The present invention relates to a rubber hose with a reinforced hose wall for conveying, in wet condition, large-volume sharp-edged solid materials, in which the inner wall of the hose is provided with a rubber layer serving as protection against wear.

Rubber hoses of this type are primarily used in suction and pressure conduits of suction dredges and are subjected to considerable wear because the material to be conveyed severely damages the inner wall of the hose by cutting into it. To avoid such damages, the interior of the hoses was lined with a wear protective layer of cut-resistant and abrasion-resistant rubber having a thickness of 50 mm and more, or the hoses were, after they had been manufactured, provided on the insides thereof with conical overlapping steel cups which were fastened by screws extending through the hoses. Both of these protective devices have certain drawbacks. A thick rubber layer is frequently destroyed in a short time due to cuts and abrasion; the lining with steel cups is rather expensive and, in view of the danger of jamming or clamping of the cups with regard to each other, is only effective to a limited extent and can be employed only in connection with suction hoses.

It is, therefore, an object of the present invention so to design a rubber hose for conveying large-volume and sharp-edge materials that its wear sensitivity can be considerably reduced and that it can be employed as suction and as pressure hose.

This object and other objects and advantages of the invention will appear more clearly from the following specification in connection with the accompanying drawing, in which.

Figure 1:
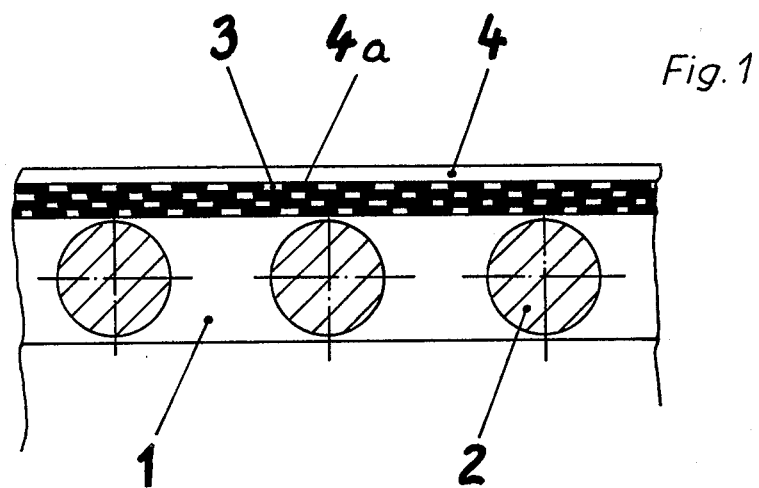
FIG. 1 represents a section through a portion of a hose according to the invention.

The rubber hose according to the present invention is characterized primarily in that metallic bodies are firmly embedded in the rubber hose which have essentially the same thickness as the rubber layer of the hose.

The embedded metallic bodies, which are preferably designed as rings or spirals extending over the entire length of the hose, form a support for the large-volume material to be conveyed and prevent such material to a certain extent from deeply entering into the rubber layer. On the other hand, the axial space between the individual metallic bodies which is completely filled with wear resistant rubber is still so large that the flexibility of the hose is not impaired.

When employing rubber hoses according to the present invention in pressure conduits there exists the danger that the walls of the hoses will in the region of the metallic bodies be lifted off from the metallic bodies or from the rubber layer as a result of which the overall strength of the hoses will be affected. This, however, will be prevented by a preferred embodiment of the invention according to which on the reinforcement, in the region of the metallic bodies, a supporting element is firmly resting which is adapted as to its shape to the spatial shape of the metallic bodies and which may consist of metallic or textile fabric.

Referring now to the drawing in detail, the inner side of the wall of a rubber hose which in a manner known per se comprises a reinforcing insert 3 with an outer rubber cover layer 4 is provided with a rubber layer 1 as protection against wear. Annular or helically-shaped metallic bodies 2 of round steel are in a firmly adhering manner embedded in the rubber layer 1. These metallic bodies are spaced from each other in the axial direction of the hose. The material diameter of these metallic bodies 2 equals approximately the thickness of the rubber layer 1.

Figure 2:
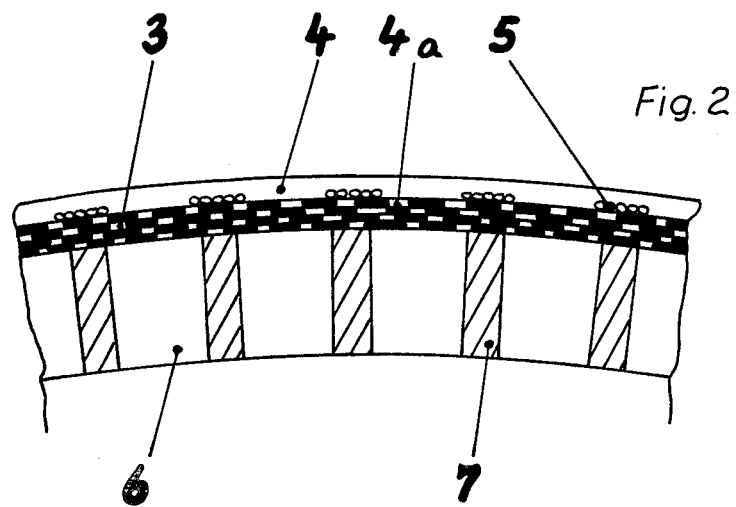
FIG. 2 shows in section another embodiment of a hose according to the invention.

The wall of the rubber hose shown in FIG. 2 likewise includes a reinforcing insert 3 forming an intermediate reinforcing layer and an outer rubber cover layer 4 having an interface 4a abutting the intermediate reinforcing layer. The annular metallic bodies 7 of profiled steel extend over the entire thickness of an elastomeric rubber layer 6 serving as wear protective layer so that this rubber layer 6 is subdivided into a plurality of rings with rectangular cross section. The elastomeric rubber layer 6 abuts the intermediate reinforcing layer 4. Within the region of the metallic bodies 7, supporting elements 5 rest on the reinforcing insert 3. The supporting elements 5 are embedded in the outer layer 4 and firmly resting on the reinforcing insert within the region of the metallic bodies for supporting said reinforcing insert 3. These supporting elements 5 may be designed in conformity with the spatial shape of the metallic bodies 7 as rings or as a spiral extending over the entire length of the hose.

While the reinforcing insert 3 may be of any suitable material and shape known per se, it has been found particularly advantageous, to employ as reinforcing insert 3 individual threads or cords or fabric or plaited work of natural or synthetic fibers of wires or of strands.

It is, of course, to be understood that the present invention is, by no means, limited to the specific showing in the drawing but also comprises any modifications within the scope of the appended claims.

What I claim is:

1. A hose wall specifically utilized only in dredging hoses wherein abrasive solid materials in wet condition particularly with sharp edges are conveyed in large volume internally both by pressure and also by suction through the hoses and thereby the interior surfaces of the hoses are subjected to slashing and wear due to the sharp edges, the hose wall comprising in combination:

an outer layer of wear-resistant elastomeric material, said outer layer having an inner surface;

a reinforcing intermediate layer abutting the inner surface of the outer layer, the intermediate layer having reinforcement means embedded therein;

an inner layer of wear-resistant elastomeric material abutting the intermediate reinforcing layer and sandwiching the intermediate reinforcing layer between the inner and outer layers, said inner layer having an exposed surface facing the interior of the hose as protection against wear;

metallic rings having a rectangular cross-section are embedded in the elastomeric inner layer; said rings engaging against said intermediate reinforcing layer and extending continuously between the intermediate reinforcing layer and the exposed surface of the inner layer, said rings being spaced axially of said hose with the elastomeric material of said inner layer therebetween and having metallic exposed surfaces also facing the interior of the hose when the hose wall is viewed in longitudinal cross-section, whereby the exposed surfaces of said rings protect the inner surface of the hose wall as the sharp-edge material moves longitudinally through the hose defined by the wall while allowing the hose to flex as the elastomeric material of the inner layer is compressed or tensioned between said rings and, additional reinforcing means radially aligned with said metal rings and positioned between the outer layer and said reinforcing intermediate layer to provide additional support for the embedded metallic insert means, the axial space longitudinally between said rings is completely filled with the wear-resistant elastomeric material so large in configuration that flexibility of the hose is unimpaired while overall strength of the hose is enhanced by said additional reinforcing means which prevents the layers of the hose from separation from the metallic ring containing inner layer.

* * * * *

UNITED STATES PATENT AND TRADEMARK OFFICE
CERTIFICATE OF CORRECTION

PATENT NO. : 4,461,324

DATED : July 24, 1984

INVENTOR(S) : Klaus Schneider

It is certified that error appears in the above-identified patent and that said Letters Patent is hereby corrected as shown below:

On the title-abstract page, please correct the same as follows:

[75] Inventor: Klaus Schneider, Hamburg, Fed. Rep. of Germany

Signed and Sealed this

Twenty-sixth Day of February 1985

[SEAL]

Attest:

DONALD J. QUIGG

Attesting Officer    Acting Commissioner of Patents and Trademarks